(12) United States Patent
Mildner et al.

(10) Patent No.: US 8,113,572 B2
(45) Date of Patent: Feb. 14, 2012

(54) ROCKER PANEL STRUCTURE

(75) Inventors: Udo Mildner, Limburg (DE); Thomas Enderich, Huenstetten (DE); Lothar Teske, Aschaffenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 12/569,373

(22) Filed: Sep. 29, 2009

(65) Prior Publication Data

US 2010/0140981 A1    Jun. 10, 2010

(30) Foreign Application Priority Data

Sep. 30, 2008   (DE) .......................... 10 2008 049 758

(51) Int. Cl.
*B60J 7/00* (2006.01)
(52) U.S. Cl. ......................................... 296/209; 296/29
(58) Field of Classification Search .................. 296/209, 296/30, 29
See application file for complete search history.

(56) References Cited

U.S. PATENT DOCUMENTS

| 6,193,306 | B1 * | 2/2001 | Lee .............................. 296/209 |
| 6,196,621 | B1 | 3/2001 | VanAssche et al. |
| 6,409,257 | B1 | 6/2002 | Takashina et al. |
| 6,474,722 | B2 | 11/2002 | Barz |
| 6,709,047 | B2 * | 3/2004 | Burge ........................... 296/209 |
| 7,264,302 | B2 * | 9/2007 | Nagashima .............. 296/187.12 |
| 2001/0040388 | A1 | 11/2001 | Barz |
| 2002/0043821 | A1 | 4/2002 | Takashina et al. |

FOREIGN PATENT DOCUMENTS

| DE | 10049226 A1 | 4/2002 |
| DE | 102006014963 A1 | 10/2007 |

* cited by examiner

*Primary Examiner* — Joseph Pape
(74) *Attorney, Agent, or Firm* — Ingrassia Fisher & Lorenz, P.C.

(57) ABSTRACT

In a motor vehicle body, plates of a rocker panel reinforcement situated inside a rocker panel are led up to a terminus part manufactured from plastic. A front wall of the terminus part is led up almost to a tire envelope curve. In the event of a crash of the motor vehicle, occurring forces are introduced particularly early into the plates of the rocker panel reinforcement.

14 Claims, 7 Drawing Sheets

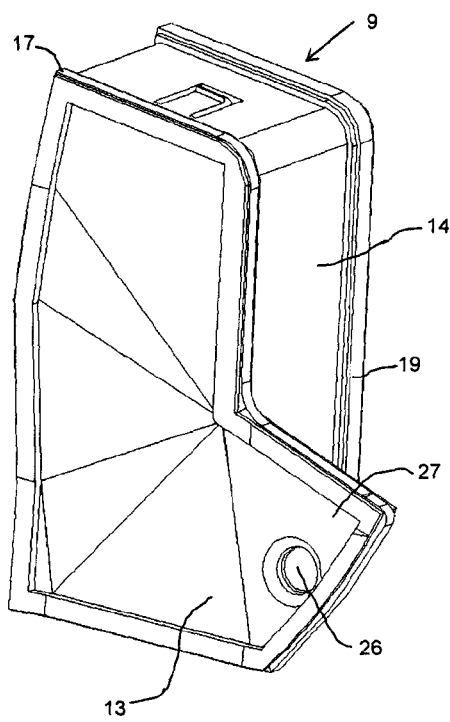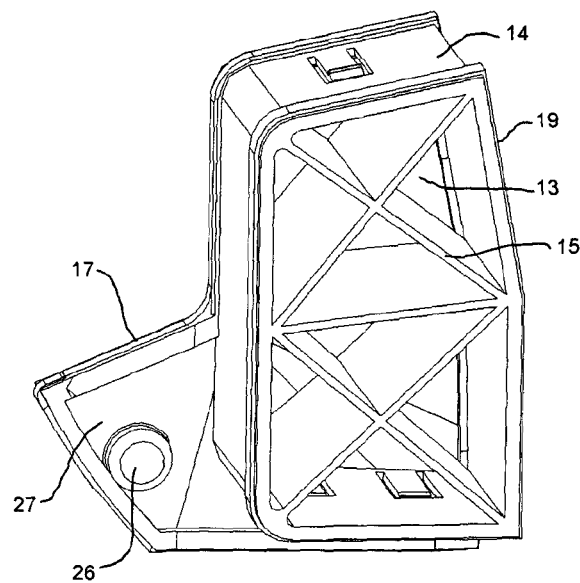
Fig. 5
Fig. 6

400; # ROCKER PANEL STRUCTURE

CROSS-REFERENCE TO RELATED APPLICATION

This application claims priority to German Patent Application No. 102008049758.4, filed Sep. 30, 2008, which is incorporated herein by reference in its entirety.

TECHNICAL FIELD

The invention relates to a motor vehicle body for a motor vehicle having two rocker panels, which are situated laterally and point in the travel direction, and are implemented as hollow profiles, and having a terminus part, which is manufactured from plastic, for covering at least one of the ends of the rocker panels.

BACKGROUND

Rocker panels of such motor vehicle bodies contribute to the safety of the occupants in the event of a crash. For this purpose, it is necessary for the rocker panels to be led as close as possible to a wheel of the motor vehicle, in order to dissipate impact energy as early as possible. In addition, the ends of the rocker panels are to be protected from penetration of dirt and moisture. The terminus part is provided for this purpose.

A motor vehicle body of the type cited at the beginning is known, for example, from DE 10 2006 014 963 A1. In this motor vehicle body, a hollow profile is closed by a seal unit. The seal unit has a frame spaced apart from the inner side of the hollow profile. A wall seal, which is formed by an expanding foam seal, is situated between the frame and the inner side of the hollow profile. The frame is adapted to the cross-section of the hollow profile using the expanding foam seal. The seal unit has pivotable flaps to ventilate the hollow profile. In this way, the motor vehicle body has a very complex construction at the ends of the rocker panels. The fixing of the seal unit in the hollow profile upon the generation of the expanding foam seal additionally proves to be very difficult.

Furthermore, a seal for a hollow profile is known from DE 100 49 226 A1, in which a tube situated therein generates continuous ventilation. This seal has a peripheral flange which is glued into a hollow profile. The precise positioning of the seal in the tube proves to be very difficult.

However, the known motor vehicle bodies have the disadvantage that the terminus part manufactured from plastic is complex to install and does not contribute to an increase of the stability of the rocker panel in the event of a crash.

The invention is based on the problem of refining a motor vehicle body of the type cited at the beginning so that it allows the earliest possible introduction of forces into the rocker panel in the event of a crash.

SUMMARY

This problem is solved according to the invention in that a front wall of the terminus part overlaps a plate of a rocker panel reinforcement which is situated inside the hollow profile. Through this design, the terminus part is capable of transmitting forces arising during the crash directly to the plate of the rocker panel reinforcement, as soon as a wheel reaches the terminus part, for example. The terminus part thus contributes to the rigidity of the rocker panel and to the crash safety of the motor vehicle. The plates of the rocker panel reinforcement situated inside the hollow profile are preferably led directly up to the terminus part. The terminus part is thus supported directly against the plates of the rocker panel reinforcement and is capable of introducing forces into the rocker panel early in the event of a crash. Furthermore, the installation of the terminus part is simplified by the support of the terminus part on the plates of the rocker panel reinforcement.

The end of the rocker panel which is formed by the terminus part and points in the travel direction of the motor vehicle may be led particularly close to a wheel of the motor vehicle according to another advantageous refinement of the invention if an upper delimitation of the terminus part protrudes beyond a lower delimitation of the terminus part viewed in the travel direction of the vehicle. Through this design, in the event of a crash of the motor vehicle, a wheel of the motor vehicle is supported particularly early by the terminus part and thus by the rocker panel.

The fastening of the terminus part in the rocker panel has a particularly simple design according to an advantageous refinement of the invention if the terminus part has at least one peripheral channel having adhesive or plastic foam situated therein. The adhesive or the plastic foam may thus be metered significantly more sparingly than with complete filling of the periphery of the terminus part and the inner wall of the rocker panel.

According to another advantageous refinement of the invention, the terminus part is capable of reliably sealing the rocker panel to the introduction of moisture and dirt, if the plastic foam situated in the channel is a foam expandable under the influence of heat. Upon the lacquering of the motor vehicle body according to the invention, the foam can expand in a drying furnace and thus seal a gap between the terminus part and the inner side of the rocker panel. A relay of noises at the terminus part is additionally damped by this design.

According to another advantageous refinement of the invention, it contributes to the permanent fixing of the terminus part in the rocker panel if the adhesive situated in the channel is a structural adhesive.

According to another advantageous refinement of the invention, the rocker panel is reliably sealed against penetrating dirt if the terminus part is sealed relative to plates of an inner side wall and an outer side wall of the rocker panel.

According to another advantageous refinement of the invention, it contributes to simplifying the installation of the terminus part on the rocker panel and to the fixing of the terminus part during the curing of the adhesive or the plastic foam if the terminus part has a detent connection to the rocker panel.

According to another advantageous refinement of the invention, the detent connection has a particularly simple construction if it has an opening situated in a plate of the rocker panel and a detent hook, which is manufactured integrally with the terminus part and engages in the opening. In this way, the opening also allows ventilation of cavities adjoining the plate.

Openings pointing outside the rocker panel may be avoided easily according to an advantageous refinement of the invention if the plate having the opening for the detent connection is part of the rocker panel reinforcement situated inside the hollow profile. The plates forming the outer and the inner side walls of the vehicle body may thus be closed, so that penetration of moisture into the rocker panel is largely avoided. In particular, the distribution of the detent connection from the seal of the terminus part to different plates in the rocker panel allows a reliable seal of the rocker panel and simple ventilation inside the rocker panel.

The end of the rocker panel provided with the terminus part has particularly high stability according to another advantageous refinement of the invention if the terminus part has a flange pointing in the longitudinal direction of the rocker panel and if the flange presses directly against the plates of the rocker panel reinforcement situated inside the hollow profile.

According to another advantageous refinement of the invention, the terminus part has a particularly high stability if the flange protrudes from the front wall and if the flange and the front wall are connected to one another via reinforcement ribs. A further advantage of this design is that the terminus part may be manufactured integrally in the injection-molding method in a particularly cost-effective way.

According to another advantageous refinement of the invention, the terminus part has a particularly simple design if the terminus part has a wing, which protrudes beyond the flange, to overlap the plate of the rocker panel reinforcement.

According to another advantageous refinement of the invention, it contributes to further increasing the stability of the rocker panel if the plate of the rocker panel reinforcement has a reinforcement bead extending in the longitudinal direction of the rocker panel.

BRIEF DESCRIPTION OF THE DRAWINGS

The present invention will hereinafter be described in conjunction with the following drawing figures, wherein like numerals denote like elements, and:

FIG. 5 shows the terminus part from FIG. 2 before the installation;

FIG. 6 shows a rear view of the terminus part from FIG. 5;

DETAILED DESCRIPTION

Figure 1:
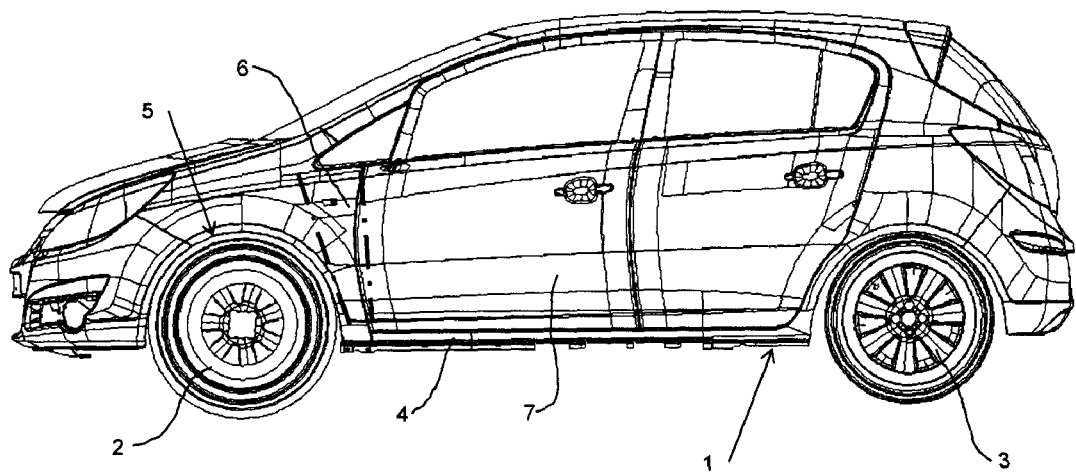
FIG. 1 shows a side view of a motor vehicle having a motor vehicle body according to an embodiment of the invention.

FIG. 1 shows a motor vehicle having a motor vehicle body 1, having wheels 2, 3, and having a rocker panel 4 situated in the floor area of the motor vehicle in the longitudinal direction. The end of the rocker panel 4 pointing in the longitudinal direction is led up to a wheel well 5 of the motor vehicle body 1. A hinge column 6 for attaching a vehicle door 7 is also led up to the end of the rocker panel 4.

Figure 2:
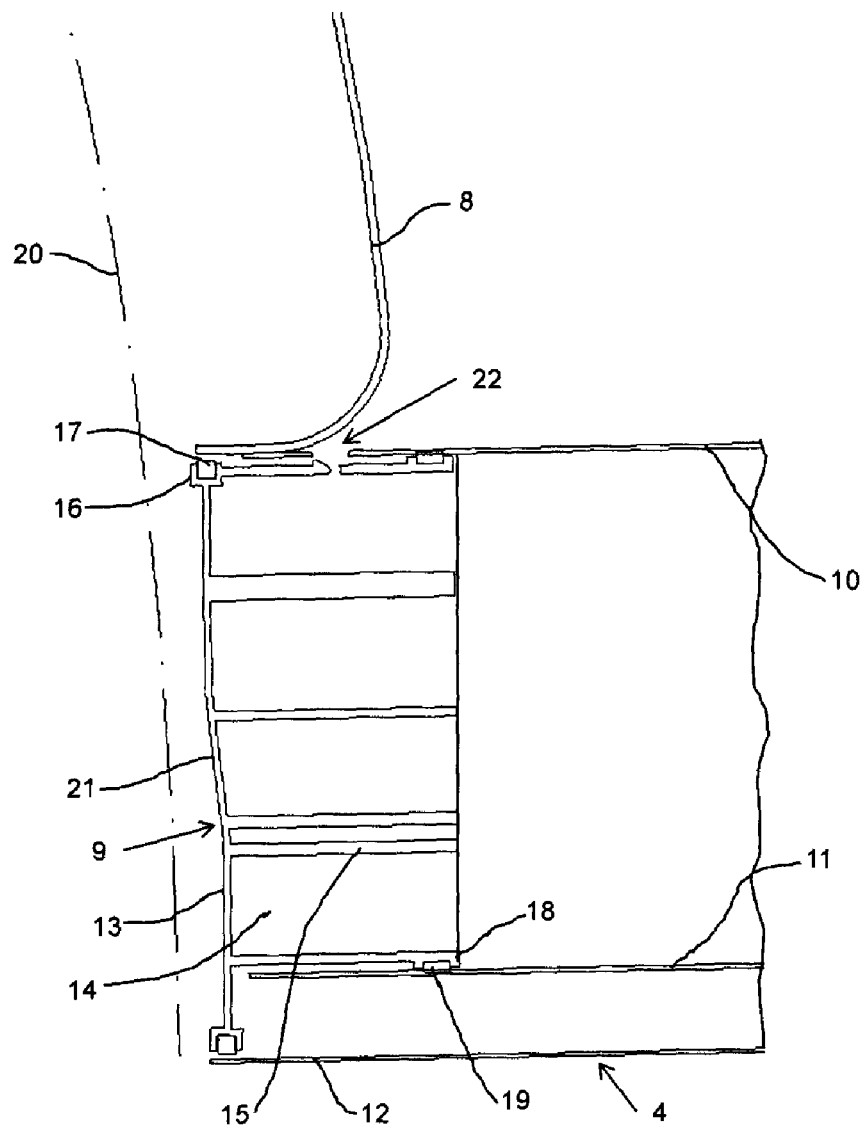
FIG. 2 shows an end of a rocker panel of the motor vehicle body pointing in the travel direction enlarged in a sectional illustration.

FIG. 2 shows a sectional illustration of the rocker panel 4, which is led up to the wheel well 5 from FIG. 1, having an adjoining plate 8 of a reinforcement of the hinge column 6 from FIG. 1 in a sectional illustration. It can be seen therein that the end of the rocker panel 4 led up to the wheel well 5 is closed by a terminus part 9. The rocker panel 4 is implemented as a hollow profile and has plates 10, 11 of a rocker panel reinforcement situated inside the hollow profile. The ends of the plates 10, 11 of the rocker panel reinforcement facing toward the wheel well 5 are overlapped by a wing-structure of the terminus part 9. The hollow profile is delimited to the outside by a plate 12 of an outer side wall.

The terminus part 9 has a front wall 13 and a peripheral flange 14, which protrudes from the front wall. The front wall 13 is connected via reinforcement ribs 15 to the flange 14. The terminus part 9 is sealed relative to the plate 12 of the outer side wall. A peripheral channel 16 for receiving a plastic foam 17, which expands under the influence of heat, is situated for this purpose in the front wall 13. Furthermore, a second peripheral channel 18 for receiving an adhesive 19 implemented as a structural adhesive is situated in the flange 14. In addition, a tire envelope curve 20 is shown in FIG. 2, which identifies the delimitation of the wheel 2 shown in FIG. 1 during the operation of the motor vehicle. Furthermore, FIG. 2 shows the delimitation of the plate 12 of the outer side wall pointing in the travel direction using dot-dash lines. The plate 12 of the outer side wall projects beyond the end of the plate 10 of the rocker panel reinforcement pointing in the travel direction by the dimension, which is less than 10 mm. The front wall 13 of the terminus part 9 also has an offset 21, so that the upper delimitation of the terminus part 9 facing toward the hinge column 6 protrudes beyond a lower delimitation of the terminus part 9 facing toward the floor of the motor vehicle body 1 viewed in the travel direction of the motor vehicle. The offset 21 thus allows the terminus part 9 to approach the wheel 2 shown in FIG. 1. The terminus part 9 also has a detent connection 22 to one of the plates 10 of the rocker panel reinforcement.

Figure 3:
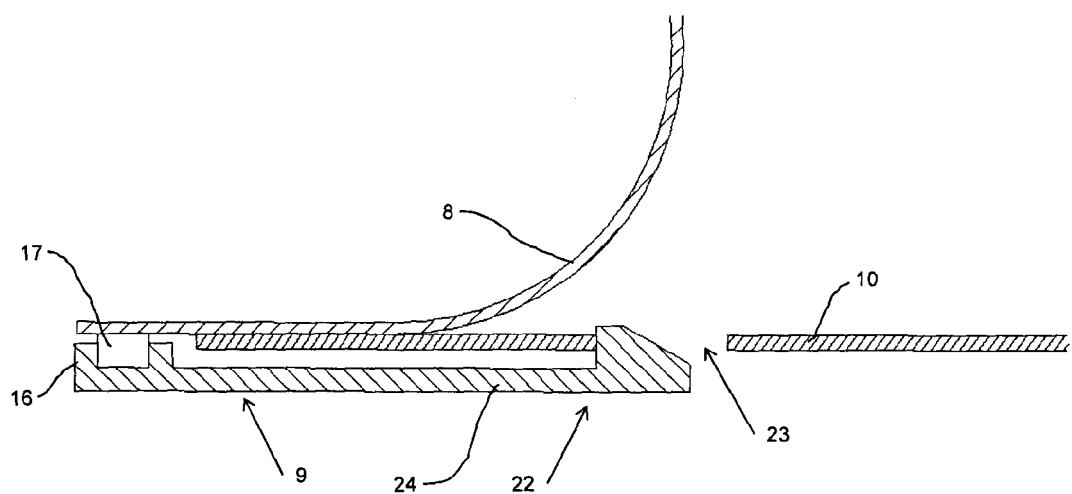
FIG. 3 shows a detent connection of a terminus part in the rocker panel from FIG. 2 greatly enlarged.

FIG. 3 shows the detent connection 22 of the terminus part 9 to the plate 10 of the rocker panel reinforcement greatly enlarged. It can be recognized that the plate 10 of the rocker panel reinforcement has an opening 23 and the terminus part 9 has a detent hook 24, which engages in the opening 23. The detent connection 22 ensures the fixing of the terminus part 9 during the installation.

Figure 4:
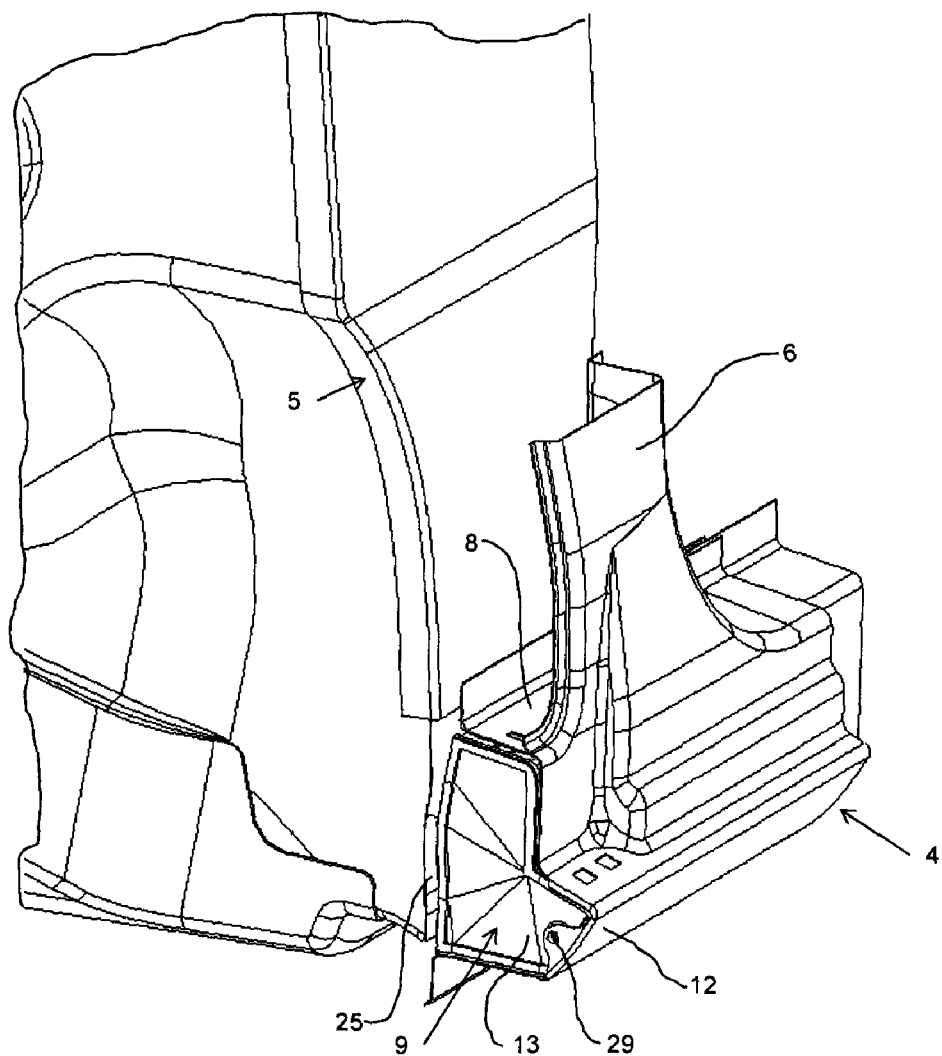
FIG. 4 shows a perspective view of the end of the rocker panel having the terminus part pointing in the travel direction.

FIG. 4 shows the end of the rocker panel 4 which adjoins the wheel well 5 with adjoining areas of the hinge column 6. The rocker panel 4 is generated by a hollow profile, which is formed by the plate 12 of the outer side wall, a plate 25 of the inner side wall, and the plate 8 of the reinforcement of the hinge column 6. The front wall 13 of the terminus part 9 presses against the inner periphery of this hollow profile and is sealed relative to the cited plates 12, 25, 8. Furthermore, the terminus part 9 has a tab 29 for fastening on a wheel well cover (not shown).

FIG. 5 shows the terminus part 9 enlarged before the installation with the adhesive 19 and the plastic foam 17.

FIG. 6 shows the terminus part 9 in a rear view. The adhesive 19 has been applied to the peripheral flange 14, while the plastic foam 17 is situated on the edge of the front wall 13 of the terminus part 9. The front wall 13 of the terminus part 9 has an indentation 26 in the embodiment shown, which allows the fastening of a wheel well cover (not shown) using an expanding rivet or a fastening screw.

Figure 7:
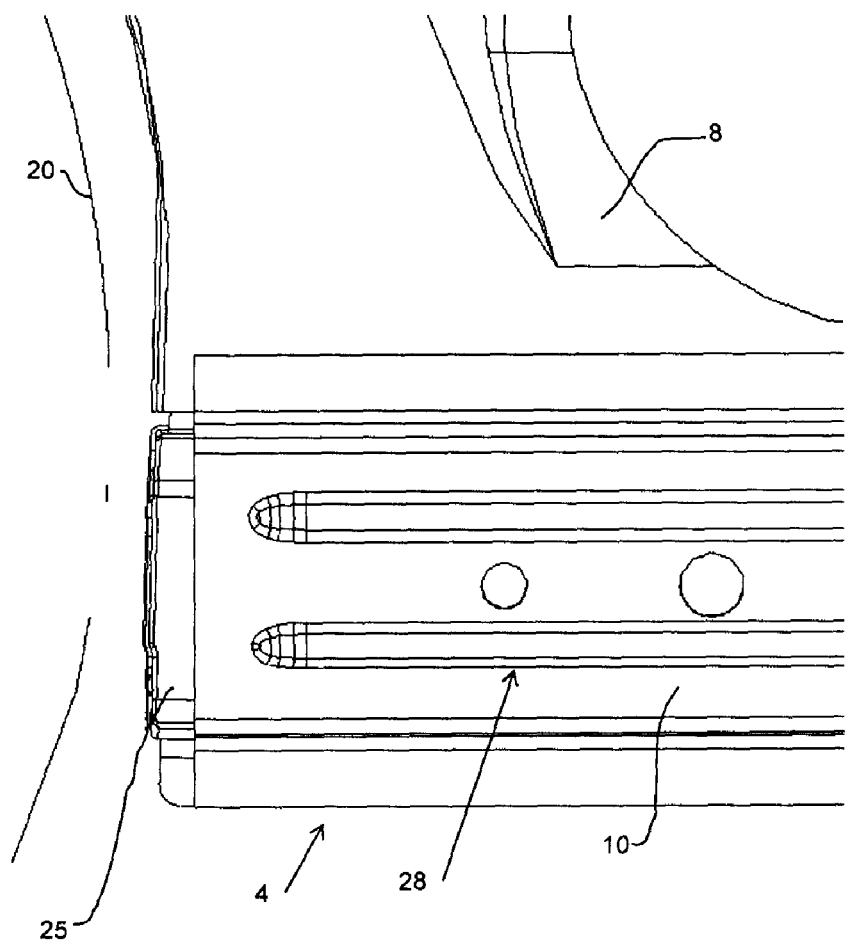
FIG. 7 shows a view of the open rocker panel.

FIG. 7 shows a side view of the end of the rocker panel 4 pointing in the travel direction without the plate 12 of the outer side wall shown in FIG. 4 and without the terminus part 9. It may be seen here that the plate 10 of the rocker panel reinforcement has a reinforcement bead 28. The reinforcement bead 28 extends in the longitudinal direction of the plate 10 of the rocker panel reinforcement. The plate 25 of the inner side wall projects beyond the plate of the rocker panel reinforcement.

Figure 8:
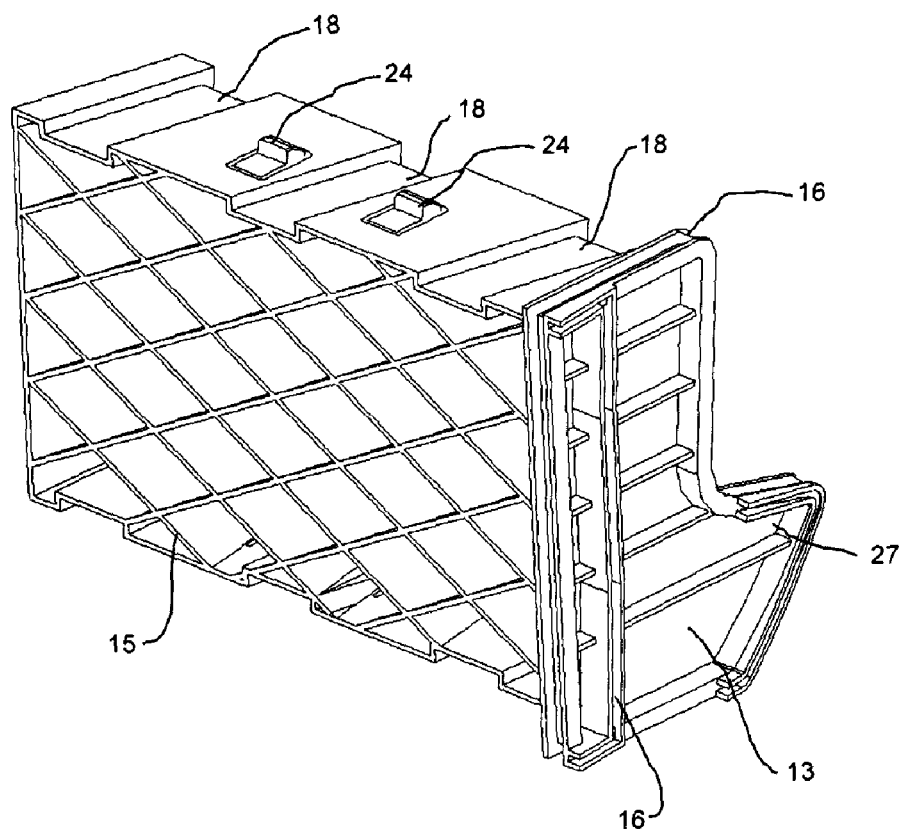
FIG. 8 shows an alternative embodiment of the terminus part.

FIG. 8 shows an alternative embodiment of the terminus part 9, in which the reinforcement ribs 15 are situated on both sides of the front wall 13.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body for a motor vehicle, comprising:
    at least two rocker panels laterally situated and pointing in a travel direction, and implemented as a hollow profile comprising a terminus part manufactured from a plastic for covering at least one end of the at least two rocker panels;
    a rocker panel reinforcement comprising a first plate situated in the hollow profile of the at least two rocker panels; and
    a front wall of the terminus part overlapping the first plate of a rocker panel reinforcement.

2. The motor vehicle body according to claim 1, wherein an upper delimitation of the terminus part protrudes beyond a lower delimitation of the terminus part viewed in the travel direction of the motor vehicle.

3. The motor vehicle body according to claim 1, wherein the terminus part comprises at least one peripheral channel comprising a plastic foam situated therein.

4. The motor vehicle body according to claim 1, wherein the terminus part comprises at least one peripheral channel comprising an adhesive situated therein.

5. The motor vehicle body according to claim 3, wherein the plastic foam situated in the at least one peripheral channel is a foam that expands under an influence of heat.

6. The motor vehicle according to claim 4, wherein the adhesive is a structural adhesive.

7. The motor vehicle according to claim 1, wherein at least one of the at least two rocker panels comprises an inner side wall and an outer side wall, and wherein the terminus part is sealed relative to the inner side wall and the outer side wall.

8. The motor vehicle body according to claim 1, wherein the terminus part has a detent connection to at least one of the at least two rocker panels.

9. The motor vehicle body according to claim 8, wherein at least one of the at least two rocker panels comprises an inner side wall and an outer side wall, and wherein the detent connection has an opening in the inner side wall, the outer side wall, or the first plate and a detent hook that is integrally manufactured with the terminus part and engages in the opening.

10. The motor vehicle body according to claim 9, wherein the opening is defined in the first plate.

11. The motor vehicle body according to claim 1, wherein the terminus part has a flange pointing in a longitudinal direction of at least one of the at least two rocker panels, and the flange presses directly against the first plate.

12. The motor vehicle body according to claim 11, wherein the flange protrudes from the front wall, and the flange and the front wall are connected via a reinforcement rib.

13. The motor vehicle body according to claim 11, wherein the terminus part has a wing projecting beyond the flange to overlap the first plate of the rocker panel reinforcement.

14. The motor vehicle body according to claim 1, wherein the first plate of the rocker panel reinforcement has a reinforcement bead extending in a longitudinal direction of at least one of the at least two rocker panels.

* * * * *